United States Patent [19]
Rivetti et al.

[11] 3,946,563
[45] Mar. 30, 1976

[54] MASTER CYLINDERS FOR DUAL HYDRAULIC BRAKING SYSTEMS

[75] Inventors: Enrico Rivetti; Giuseppe Rosso, both of Turin, Italy

[73] Assignee: Fiat societa per Azioni, Turin, Italy

[22] Filed: June 14, 1974

[21] Appl. No.: 479,377

[30] Foreign Application Priority Data
June 14, 1973 Italy .................................. 68751/73

[52] U.S. Cl. ..................................... 60/535; 60/562
[51] Int. Cl.² ................................................ F15B 7/00
[58] Field of Search ............. 60/562, 535, 589, 591, 60/534; 116/118, 534

[56] References Cited
UNITED STATES PATENTS

| | | | |
|---|---|---|---|
| 2,045,024 | 6/1936 | Renken et al. | 277/2 X |
| 2,230,501 | 2/1941 | MacArthur | 277/59 X |
| 2,394,364 | 2/1946 | Christensen | 277/59 |
| 3,059,435 | 10/1962 | Rusconi | 92/86 X |
| 3,358,446 | 12/1967 | Wortz | 60/535 |
| 3,387,851 | 6/1968 | Cugini | 277/2 |
| 3,463,554 | 8/1969 | Bueler | 92/5 R X |
| 3,501,915 | 3/1970 | Harkett | 60/535 |
| 3,606,486 | 9/1971 | Doerfler | 60/535 X |
| 3,633,367 | 1/1972 | Baldwin | 60/562 |
| 3,686,864 | 8/1972 | Shutt | 60/535 X |

FOREIGN PATENTS OR APPLICATIONS

| | | | |
|---|---|---|---|
| 1,030,956 | 5/1966 | United Kingdom | 60/589 |
| 1,134,904 | 8/1962 | Germany | 60/562 |
| 1,379,704 | 10/1964 | France | 60/562 |

*Primary Examiner*—Martin P. Schwadron
*Assistant Examiner*—H. Burks, Sr.
*Attorney, Agent, or Firm*—Sughrue, Rothwell, Mion, Zinn and Macpeak

[57] ABSTRACT

A master cylinder for a dual hydraulic braking system has two pistons arranged end-to-end in respective bore sections, each piston having sealing valves which close off communication between front and rear brake circuits and respective reservoirs when displaced by operation of a brake pedal to cause pressurization of respective compression chambers connected to the brake circuits. This invention provides two seals in the inner piston between the two compression chambers and an auxiliary chamber defined between these seals into which small quantities of brake fluid escape in the event of leakage from either compression chamber to give visual warning of such leakage.

1 Claim, 2 Drawing Figures

MASTER CYLINDERS FOR DUAL HYDRAULIC BRAKING SYSTEMS

BACKGROUND OF THE INVENTION

The present invention relates to a master cylinder for dual hydraulic brake circuits, with frontal sealing valves.

Master cylinders of this type usually consist of a cylinder having one end closed and the other open, with first and second pistons, preferably identical to each other, each sliding in a respective bore section of corresponding diameter formed inside the cylinder. First and second reaction springs are interposed respectively between the first and the second piston and between the closed end of the cylinder and the second piston, keeping both pistons in normal positions spaced furthest away from the closed end of the cylinder. In this way the pistons define with the internal walls of the cylinders two compression chambers each of which is in use of the master cylinder connected via appropriate passages and ducts to a respective reservoir and to respective brake actuator cylinders for the rear and front wheels of the vehicle. Each piston is further equipped with frontal valve means adapted, upon operating the brake pedal, to interrupt the communication between the compression chambers and the reservoirs, thus allowing the brake fluid in the compression chambers to be pressurised to operate the brake actuators.

In master cylinders of this type eventual wear or damage of the intermediate sealing gasket of the second piston nearer to the closed end of the cylinder, which ensures the sealing of the piston in the respective cylinder bore, cannot be noticed in any way and the master cylinder then functions as a common master cylinder for a single circuit so that further damage to any other part of the system then puts out of action the entire braking system. This results from the fact that, upon operating the brake pedal, the front sealing valves interrupt the communication with the reservoirs, so that the fluid can flow only from one compression chamber to the other without being able to flow into one of the reservoirs and raise the fluid level therein. Consequently it is impossible to adopt as a brake fault warning one of the signalling systems known for detecting such rises, for example a float system associated with the reservoirs.

An object of the present invention is to provide a master cylinder of the aforesaid type, which is free of the above mentioned disadvantages and in which any damage or deterioration of the intermediate sealing gasket abovementioned can be noticed immediately, while independence of the two brake circuits is ensured at all times.

SUMMARY OF THE INVENTION

This and other objects are achieved according to the present invention by the provision of a master cylinder comprising:

a cylinder having one end closed and one end open, means defining first and second bore sections within the cylinder, a first piston slidably mounted in the first bore section, a second piston slidably mounted in the second bore section, a first reaction spring interposed between the first piston and the second piston, a second reaction spring interposed between the closed end of the cylinder and the second piston, said reaction spring maintaining both pistons in normal positions spaced from the closed end of the cylinder, the said pistons defining with the internal walls of the cylinder two compression chambers, duct means in the cylinder for connecting each compression chamber with a respective brake fluid reservoir and with respective brake actuators, valve means carried by each piston for interrupting, by operation of a brake pedal, communication between the respective compression chambers and the respective reservoirs to allow brake fluid to be pressurised by the respective pistons to operate the respective brake actuators, two spaced apart external peripheral seals carried by the second piston, means defining a peripheral annular groove in said second piston between said two seals, said groove defining an annular auxiliary chamber, and a radial through hole in said cylinder communicating with the outside and in constant communication with the said auxiliary annular chamber in any axial position of the said second piston.

BRIEF DESCRIPTION OF THE DRAWINGS

The invention will now be described, by way of non-restrictive example, with reference to the attached drawings, wherein.

DETAILED DESCRIPTION OF THE ILLUSTRATED EMBODIMENT

Figure 1:
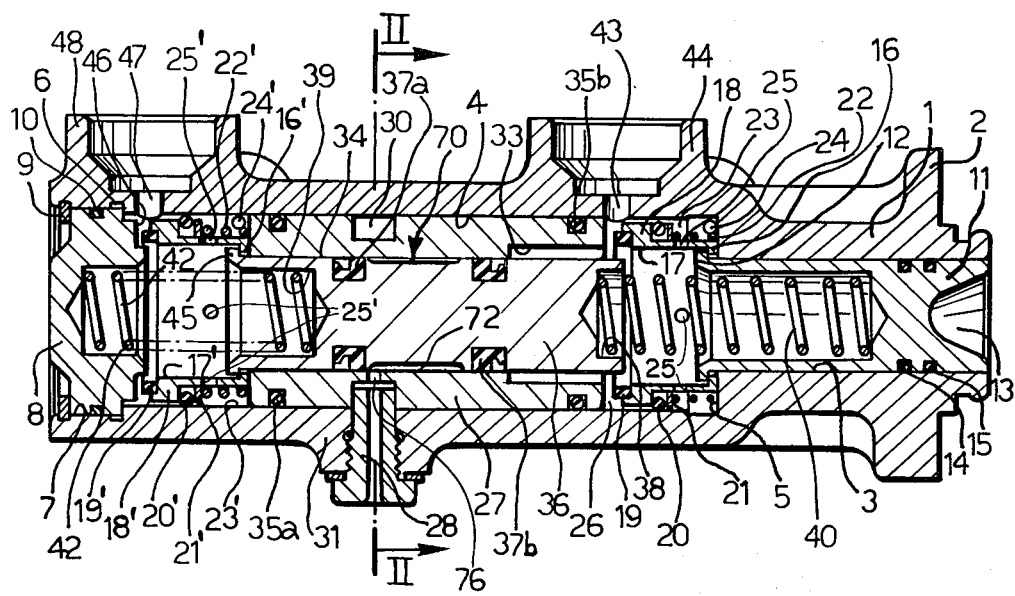
FIG. 1 is a longitudinal cross section of a master cylinder according to one embodiment of the invention.

The master cylinder shown in the drawings consists of a body 1, formed at one of its ends with an external radial flange 2 for the mounting of the cylinder on to a fixed part of the body of a motor vehicle (not shown). The internal bore of the cylinder is a through bore and has three sections of different diameter. The first section 3, of smallest diameter, extends for approximately one third of the total length of the cylinder, from the end of the cylinder that carries flange 2. The adjoining second section 4, of larger diameter, begins at a radial annular shoulder 5 and extends to a zone situated at a short distance from the end of the cylinder opposite the end that carries flange 2, terminating at a narrow radial annular shoulder 6. The third section 7, of yet larger diameter, extends from the shoulder 6 to the other end of the through bore. A substantially cylindrical plug 8 is inserted in the third bore section 7 and is held against the shoulder 6 of the cylinder by an elastic split ring 9. On the external periphery of the plug 8 there is an annular groove housing an O-ring seal 10 the external surface of which is lightly pressed against the walls of the bore section 7.

A first piston 11 is mounted for sliding movement with slight play in the first bore section 3 of the cylinder, and normally fills all this section. One end of the piston 11 protrudes into the adjoining second section 4 and is formed with a radial flange 12 the diameter of which is larger than the inner diameter of the radial shoulder 5. At the opposite end, the piston 11 has an external notch 13 which forms a seat for engagement by one end of a push-rod (not shown) driven by the brake pedal of the vehicle on which the master cylinder is mounted. At a short distance from notch 13, on the circumference of piston 11, there are provided a pair of spaced apart peripheral grooves which house respective O-ring seals of elastic material, 14 and 15, the peripheries of which are slightly compressed against the first bore section 3 of the cylinder.

Flange 12 of piston 11 is separated from the internal shoulder 5 of the cylinder by an internal flange 16, the inner diameter of which is smaller than the outer diameter of the flange 12, formed on a sleeve 17. This sleeve 17 is formed at its end opposite flange 16 with a head 18 the outer diameter of which is slightly smaller than the diameter of the bore section 4 of the cylinder but is greater than the outer diameter of the remainder of the sleeve 17. The end face of head 18 opposite the flange 16 is formed with a seat in the form of an internal annular step which houses a frontal annular seal 19 of elastic material, the thickness of which, measured in the axial direction of the cylinder, is such that it protrudes from head 18 for a short distance in a direction away from the flange 16.

The sleeve 17 is surrounded by a seal consisting of a ring 20 made of elastic material, the external periphery of which, of arcuate profile in cross-section, is adjacent the surface of the internal bore section 3 of the cylinder. The ring 20 is pushed axially against the head 18 by an annular washer 21 which is acted upon by a spring 22 which surrounds sleeve 17, the end of the spring 22 opposite the washer 21 abutting the shoulder 5. The space 23 housing spring 22 constitutes a first compression chamber and communicates with the exterior via a duct 24 which in use of the master cylinder is connected to an external brake circuit, in this example to the circuit including the rear brake actuator cylinders (not shown) of a vehicle, preferably with the interposition of a pressure reducing valve. The sleeve 17 is also provided with a series of radial through holes 25 drilled in the region between washer 21 and internal flange 16.

The part of the frontal seal 19 protruding from the head 18 faces a radial annular end surface 26 at an end of a tubular element 27 which faces towards the open end of cylinder 1, the tubular element 27 being inserted, with slight play, in the internal bore section 4 of the cylinder. The element 27 is prevented from moving axially by a radial pin 28, the inner end of which is located in a peripheral groove 30 provided in the external periphery of the tubular element 27. Pin 28 is inserted through a corresponding radial hole made in a boss 31 of the cylinder 1 and it has a threaded part screwed into a corresponding internally threaded part of the said hole.

The bore of the tubular element 27 has an end section 33 at the end adjoining the piston 11, and a section 34 of smaller diameter which extends to the opposite end of the tubular element 27, adjoining the plug 8. On the external periphery of the tubular element 27 there are provided, on opposite sides of the pin 28, two annular circumferential grooves housing O-ring seals 35a and 35b of circular cross-section, the outer peripheries of which are slightly compressed against the surface of the internal bore section 4 of the cylinder.

Figure 2:
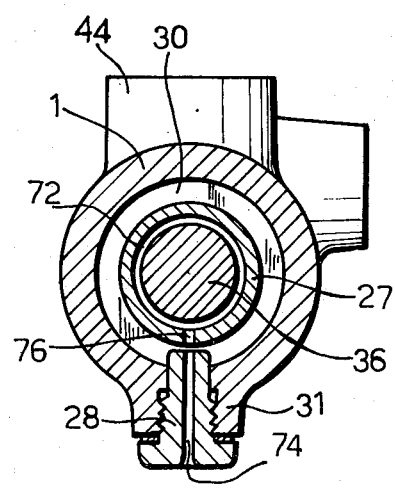
FIG. 2 is a transverse cross section on line II—II of FIG. 1.

Within the smaller diameter section 34 of the bore of the tubular element 27 there is slidably mounted a second piston 36 the diameter of which can be smaller than or equal to the diameter of the first piston 11. The second piston 36 is mounted slidably and sealingly in section 34 by two peripheral annular sealing gaskets 37a and 37b, of any cross-sectional shape, made of elastic material and slightly radially compressed, the gaskets 37a and 37b being housed in respective annular grooves formed in the periphery of the piston 36. Between the two gaskets 37a and 37b the second piston 36 has an intermediate axially extending annular groove 70 which, with the internal periphery of element 27, delimits an annular auxiliary chamber 72 (see FIG. 2). The pin 28 is provided with a through bore 74 which communicates through a radial hole 76 in the tubular element 27 with the chamber 72. The piston 36 protrudes from the bore section 34 of the tubular element 27 towards the plug 8 and protrudes to a greater extent from the bore section 34 in the direction of the piston 11, the piston 36 being provided at its opposite ends with axial sockets 38 and 39 respectively facing towards the piston 11 and towards the plug 8. Between the bottom of end socket 38 and the piston 11 a first reaction spring 40 is interposed, and between the bottom of end socket 39 and the bottom of an axial end socket in the facing end of the plug 8 a second reaction spring 42 is interposed, the rigidity of the second spring being a little greater than that of the first spring 40.

The frontal seal 19 carried by the head 18 of the sleeve 17 forms, with the radial annular end surface 26 of the tubular element 27, a valve adapted to isolate the duct 24, which communicates with the rear brake actuator cylinders, from a hole 43 provided in the wall of the body 1 of the cylinder in the proximity of the surface 26. The hole 43 is located at the bottom of an internal cavity in a boss 44 of the body 1, adapted for connection to a first brake fluid reservoir (not shown).

It will be apparent in fact that as the first piston 11 advances towards the plug 8 during braking, the flange 12 of this piston will move away from the shoulder 5 and will thus permit stretching of the pre-loaded spring 22, which will push the sleeve 17, with its head 18 and frontal seal 19, towards the radial annular end surface 26 of the tubular element 27 until the seal 19 engages the end surface 26 and interrupts communication between the duct 24 and the hole 43. The piston 11 then pressurizes brake fluid in the first compression chamber 23 to operate the rear brake actuators connected to the duct 24. The tension of the spring 22 is somewhat smaller than that of the first reaction spring 40, so that as piston 11 returns to the starting position the sleeve 17 retracts and the frontal seal 19 is withdrawn from the radial surface 26.

The end of the second piston 36 protruding beyond tubular element 27 in the direction of plug 8 is also provided with a flange 45, the external diameter of which is larger than the internal diameter of the bore section 34 of the tubular element 27. This flange 45 engages, in a manner similar to the flange 12 of the first piston 11, a valve structure adapted to co-operate with a radial annular shoulder 46 formed on the end surface of the plug 8 facing the open end of the cylinder. This valve structure includes elements corresponding to the sleeve 17, the frontal seals 19, the sealing ring 20 and the spring 22. These corresponding elements are marked with the same reference numerals with the addition of a single prime. The space 23' surrounding sleeve 17' constitutes a second compression chamber which communicates with the exterior through a duct 24' that in use of the master cylinder is connected to the circuit of the front brake actuator cylinders (not shown) of the vehicle on which the master cylinder is mounted.

During braking, contact between the front seal 19' and the radial shoulder 46 of the plug 8 interrupts communication between the duct 24' and a through hole 47 provided in the wall of the body 1 of the cylinder at the bottom of a cavity drilled in a boss 48 adapted for connection to a second brake fluid reservoir (not shown), enabling fluid in the second compression chamber 23' to be pressurised for operation of the front brakes.

The operation of a master cylinder of the kind herein described is well known to those skilled in the art, and is described, for example, in U.S. Pat. No. 3633367 dated May 27, 1970 and assigned to the same assignees as the present invention.

It will be noted that damage to one of the two seals 37a, 37b will be signalled, due to the provision of the auxiliary chamber 72 and of holes 74 and 76, by a corresponding outflow of brake fluid (naturally in minimal quantity), which can be noted directly or by any suitable signalling system.

Naturally, while keeping to the principle of the present invention details of practical embodiments can change considerably with respect to what has been described and shown in the attached drawings, without departing from the spirit and scope of the present invention. Thus, for example, the invention could be applied to a master cylinder lacking the sleeve 17, in which the holes 74 and 76 are provided in any other areas of the cylinder, as long as, whatever the position of the second piston 36, these holes are always in communication with the auxiliary chamber 72.

We claim:

1. A master cylinder for a dual hydraulic braking system for vehicles, comprising:
    a cylinder having one end closed and one end open,
    means defining first and second bore sections within the cylinder,
    a first piston slidably mounted in the first bore section,
    a tubular element fixedly secured in the second bore section,
    a second piston slidably mounted in said tubular element,
    a first reaction spring interposed between the first piston and the second piston,
    a second reaction spring interposed between the closed end of the cylinder and the second piston, said reaction springs maintaining both pistons in normal positions spaced from the closed end of the cylinder,
    the said pistons defining with the internal walls of the cylinder two compression chambers,
    duct means in the cylinder for connecting each compression chamber with a respective brake fluid reservoir and with respective brake actuators,
    valve means carried by each piston for interrupting, by operation of a brake pedal, communication between the respective compression chambers and the respective reservoirs to allow brake fluid to be pressurized by the respective pistons to operate the respective brake actuators,
    two spaced apart external peripheral seals carried by the second piston,
    means defining a peripheral annular groove in said second piston between said two seals, said groove defining an annular auxiliary chamber, and a radial through hole in said tubular element and said cylinder communicating with the outside and in constant communication with the said auxiliary annular chamber in any axial position of the said second piston.

* * * * *